(12) United States Patent
Geurts et al.

(10) Patent No.: US 10,511,390 B2
(45) Date of Patent: Dec. 17, 2019

(54) DATA SHARING USING BODY COUPLED COMMUNICATION

(71) Applicant: KONINKLIJKE PHILIPS N.V., Eindhoven (NL)

(72) Inventors: Lucas Jacobus Franciscus Geurts, Noord Brabant (NL); Vincentius Paulus Buil, Gennep (NL); Niels Laute, Venlo (NL); Floor Marijn Borgonjen, Rotterdam (NL)

(73) Assignee: Koninklijke Philips N.V., Eindhoven (NL)

( * ) Notice: Subject to any disclaimer, the term of this patent is extended or adjusted under 35 U.S.C. 154(b) by 192 days.

(21) Appl. No.: 15/513,563

(22) PCT Filed: Sep. 25, 2015

(86) PCT No.: PCT/EP2015/072180
§ 371 (c)(1),
(2) Date: Mar. 23, 2017

(87) PCT Pub. No.: WO2016/046405
PCT Pub. Date: Mar. 31, 2016

(65) Prior Publication Data
US 2017/0244496 A1    Aug. 24, 2017

(30) Foreign Application Priority Data

Sep. 25, 2014 (EP) .................................... 14186448

(51) Int. Cl.
*G06F 15/16* (2006.01)
*H04B 13/00* (2006.01)
(Continued)

(52) U.S. Cl.
CPC ............. *H04B 13/005* (2013.01); *H04B 1/40* (2013.01); *H04B 5/0031* (2013.01); *H04L 63/0428* (2013.01); *H04L 63/10* (2013.01)

(58) Field of Classification Search
CPC .... H04B 13/005; H04L 63/0428; H04L 63/10
See application file for complete search history.

(56) References Cited

U.S. PATENT DOCUMENTS

| 5,796,827 A | 8/1998 | Coppersmith |
| 8,219,028 B1 * | 7/2012 | Flamholz .............. G06F 1/1694 |
| | | 455/41.2 |

(Continued)

FOREIGN PATENT DOCUMENTS

| JP | 2006113721 A | 4/2006 |
| WO | WO2006027155 A1 | 3/2006 |
| WO | WO2014095947 A1 | 6/2014 |

*Primary Examiner* — Douglas B Blair (57) ABSTRACT

Method for sharing data (SD2) between users (11,12). The method comprises initiating body coupled communication (BCC) between first and second devices (21,22) and in response to the body coupled communication (BCC), sending a data request (Q1) from one or both of the devices (21,22) to a remote server (30). The data request (Q1,Q2) comprises first device data (ID1) and the second device data (ID2). The server (30) processes the data request (Q1) and determines shared data (SD2) based at least in part on both the first device data (ID1) and the second device data (ID2). The server sends a data response (R1) to the first device (21), wherein the data response (R1) comprises the shared data (SD2).

17 Claims, 5 Drawing Sheets

(51) Int. Cl.
*H04B 1/40* (2015.01)
*H04B 5/00* (2006.01)
*H04L 29/06* (2006.01)

(56) References Cited

U.S. PATENT DOCUMENTS

| | | | |
|---|---|---|---|
| 8,407,279 B2* | 3/2013 | Kang | H04B 5/0031 |
| | | | 709/202 |
| 8,694,613 B2 | 4/2014 | Yanai et al. | |
| 9,671,928 B2 | 6/2017 | Kreiner | |
| 2004/0152440 A1 | 8/2004 | Yoda | |
| 2008/0051033 A1 | 2/2008 | Hymes | |
| 2010/0268056 A1* | 10/2010 | Picard | A61B 5/0531 |
| | | | 600/388 |
| 2011/0238755 A1* | 9/2011 | Khan | H04W 4/21 |
| | | | 709/204 |
| 2012/0023169 A1 | 1/2012 | Kang | |
| 2013/0324056 A1* | 12/2013 | Maguire | H01Q 1/245 |
| | | | 455/73 |
| 2014/0129626 A1* | 5/2014 | Smadi | H04W 4/08 |
| | | | 709/204 |
| 2014/0141720 A1* | 5/2014 | Princen | H04L 63/0407 |
| | | | 455/41.2 |
| 2014/0143333 A1 | 5/2014 | Dodge | |
| 2014/0283017 A1* | 9/2014 | Chandra | G06F 21/32 |
| | | | 726/19 |
| 2014/0310519 A1* | 10/2014 | Yoo | G06F 21/6209 |
| | | | 713/165 |
| 2015/0156171 A1* | 6/2015 | Biswas | H04L 63/04 |
| | | | 726/26 |
| 2015/0372770 A1* | 12/2015 | Ouzounov | H04W 4/80 |
| | | | 455/41.2 |
| 2016/0004871 A1* | 1/2016 | Guedalia | H04W 4/023 |
| | | | 726/26 |
| 2016/0330573 A1* | 11/2016 | Masoud | H04W 4/90 |
| 2018/0103339 A1* | 4/2018 | Roundtree | H04W 4/80 |

* cited by examiner

DATA SHARING USING BODY COUPLED COMMUNICATION

FIELD OF THE INVENTION

The present disclosure relates to data sharing via body coupled communication, in particular to a method for sharing data between users, a body-coupled communication device, and a computer server.

BACKGROUND OF THE INVENTION

Body-Coupled Communication (BCC) is an emerging near field communication technology that uses the human (or animal) body to propagate data by wireless communication over the body between devices that are on or in close proximity with the body. The BCC technology has several important characteristics that make it particularly suitable for a wide range of wearable consumer and medical devices. For example, it can address the needs that the current communication approaches struggle with: ease-of-use, privacy, security, high data rate with high energy efficiency.

For example U.S. Pat. No. 8,407,279 describes a method for providing a social network service using human body communication including sensing a human body contact; transmitting or receiving data through a human body communication; storing at least one of social data, user data, reference data, and additional data collected; identifying a contact object using the data received via the human body communication; and analysing a pattern of contact with the contact object using at the stored data.

US2012/023169 describes information exchanges between individuals using body-coupled communications. The communications are between mobile devices carried by the individuals and are at a local level.

US2004/152440 describes passing a pointer to data held on the internet. It describes passing an email address via body-coupled communications which is then used by the receiving device to send a link with the data to the sending device. Thus there is a unidirectional passing of data to one device, the data having been selected by one user on their device.

WO2014/095947 (D3) and U.S. Pat. No. 5,796,827 (D4) disclose various communications using BCC but do not mention at all the case of two users or the passing any form of information between them.

Advantageously, body coupled communication allows an easy and intuitive way for sharing data between users. For example, body coupled communication involving multiple users can provide an easy way to come up with a single multimedia playlist for multiple persons, or compare and grant access to multiple data sets (e.g. medical data). However, unrestricted data sharing may raise security or privacy concerns. On the other hand, restricting data access may hinder easy and intuitive sharing of relevant data made possible by the body coupled communication.

Accordingly there is a desire to improve control over data sharing using body coupled communication.

SUMMARY OF THE INVENTION

A first aspect of the present disclosure provides a method for sharing data between users. The method comprises providing a first device storing first device data associated with a first user and capable of body coupled communication. A second device storing second device data is associated with a second user and also capable of body coupled communication. Body coupled communication is initiated between the first and second devices, e.g. via the bodies of the first and second users. In response to the body coupled communication, a data request is sent from one or both of the devices to a remote server. The data request comprises the first device data and the second device data. The remote server processes the data request and determines to-be-shared data based (at least in part) on both the first device data and the second device data. A data response is sent from the remote server at least to the first device. The data response comprises the to-be-shared data.

By providing a combination of body coupled communication between the user devices and remote communication with an independent server, the advantages body coupled communication are maintained while data control can be improved via the independent server. The server can have access to device data from both devices and determine which user data to share with either device. Accordingly, it is not necessary to share all data with another user to determine common interest.

For example, a body coupled communication between user devices may cause one or both the devices to send identifiers associated with the respective users and the server can determine which data of one user may be shared with the other user. By sending the identifier from one device to the other device, only one of the devices needs to communicate with the remote server. On the other hand, data security may be improved if each device sends a data request to the server. The server may provide a response with shared data to one or both the devices. The response and shared data may be different, e.g. a first user receives shared data from a second user and the second user receives shared data from the first user. The response may also be the same, e.g. based on an overlap between data of the users. The response may also be dependent on other criteria, e.g. another type of comparison between the data of the users. For example, when two users each have a data set with their own collection of multimedia content, the server may compare the multimedia content of both users and determine a recommended multimedia content based on the comparison. The comparison may also be performed based on metadata, e.g. a genre of the multimedia. The shared data may also include new content that is not part of the own collections of both users. For example, the media collections can be used as interest profiles which are combined to generate a common interest profile, which is used by a service to recommend content. Accordingly, the data response of the server may be based on various criteria including commonality, recommendation, and/or access rights of the available user data.

The data record of a user may be stored on the respective device or it can be stored in a remote location, e.g. the same remote server used for determining data sharing. By storing user data on a remote server, the storage requirements of the user devices can be lower. When the same remote server is user for both storing the user data and determining access to the user data, communication efficiency can be improved. Alternatively, the remote server may access a further server to retrieve user data. Alternatively, user data may also be stored on the user devices and first sent to the remote server. The remote server may then determine which of the data is shared between the devices. Some user data may also be sent between the devices via the body coupled communication. For example, the server may mediate which data to send or when to send it. In this way, data traffic from the server to the devices may be reduced. The server may also enable communication between the devices, e.g. by providing decryption of data transmitted between the devices via body coupled communication. For example, the server may provide a decryption key to one or both of the devices. Data security between the devices can be improved when the decryption key is sent via a separate communication channel. Data access may be provided by the server for a restricted period of time, e.g. after establishing the body coupled communication. Data access may also be restricted based on location. For example, the server may grant user device access to a data set based on the proximity (distance) between the user device and a location device. The location device may be part of a second user device or separate therefrom, e.g. tied to a specific location. For example, data access can be terminated when a distance between the first device and the second device exceeds a certain distance. The distance may be measured/detected e.g. by the second device and signalled to the server. The data access may also be terminated e.g. in response to other instructions from one of the user devices.

Further security may be provided by allowing a user to manually confirm the sharing following body coupled communication. In this way unintended sharing between users can be prevented. The security can be even further improved by a security confirmation of a user. For example a personal identification number (PIN) may be entered in the device. Also biometric security may be added to the device, e.g. a finger print reader.

In a second aspect, the present disclosure provides a body-coupled communication device. The device comprises a coupler arrangement configured to couple signals between the device and a human body for performing body coupled communication via the body with a second body-coupled communication device. The device further comprises a transceiver configured to transmit and receive data to and from a remote server independent of the coupler arrangement. The device further comprises a controller configured to listen for body coupled communication from the second device via the coupler arrangement. In response to the body coupled communication, a data request is transmitted to the remote server via the transceiver. After sending the data request, the controller listens for a data response from the remote server via the transceiver. The controller may then process the response, e.g. to retrieve the shared data. Typically, the shared data may then become available to a one or more users of the device(s), e.g. visible on screen or perceived in any other way, e.g. via audio. As noted above, the device may be send the data request including only its own device data. Alternatively, the device may include second user data received from a second body-coupled device in the data request. Also other embodiments of the methods described herein can be implemented e.g. as program instruction on the device.

In a third aspect, the present disclosure provides a computer server comprising a transceiver, a controller, and a memory storing program instructions. When the program instructions are executed by the controller they cause the controller to control the transceiver to listen for one or more data request from a first and/or second device. The one or more data requests comprise a first identifier associated with a first user and a second identifier associated with a second user. In response to receiving the one or more data requests, the data requests are processed to determine the first and second identifiers. In one embodiment, a data record of the second user associated with the second identifier is determined. Furthermore access rights of the first user associated with the first identifier are determined. Accordingly, a to-be-shared part of the data record of the second user is determined based on the access rights of the first user. A data response is compiled based on the to-be-shared part of the data record. The controller may send the data response from the remote server to the first device via the transceiver. It will be appreciated that one or more devices according to the second aspect and/or the server according to the third aspect may perform respective parts of the method according to the first aspect. Respective embodiments of the method are considered to inherently disclose their implementation in respective hardware, including program instructions.

BRIEF DESCRIPTION OF THE DRAWINGS

These and other features, aspects, and advantages of the apparatus, systems and methods of the present disclosure will become better understood from the following description, appended claims, and accompanying drawing wherein:

DETAILED DESCRIPTION OF EMBODIMENTS

The present disclosure relates to body coupled communication (BCC) which allows data signals to travel via the capacitive field around the human body. This can improve the usability and intuitiveness of use cases and interacting with objects in situations. With BCC the user is able to touch an object or other users, while holding a mobile device or wearing a smart watch, and then start a direct data comparison to come up e.g. with recommendations or share specific data subsets. The system identifies the users or object, but does not need to disclose the data to those users or object to improve privacy.

Conventionally, it can sometimes be quite cumbersome e.g. to come up with a single multimedia playlist for multiple persons, or compare & grant access to multiple data sets (e.g. medical data) that are stored on local devices or in the cloud. The present disclosure provides an ad-hoc way to make this process more intuitive and very easy to use. It makes use of the principle that the BCC signal can travel through people, devices and objects—and a system that compares data real-time. The disclosure may further provide a way to compare local, or remote, data sets by making a physical connection between two or more users or objects. This improves security, and provides a way to compare these data sets without disclosing any data to the users.

Some embodiments may include one or more of the following aspects. Body coupled communication connection is established between two or more people (e.g. via touching, holding each other's hands). Each person has a device (e.g. mobile phone or wrist-based device) enabled with body coupled communication for this purpose. When the connection is established between the groups of people/objects an action is performed by sending specific data (based on use case) to a central server/system. A central system (server) compares the incoming datasets to see what is relevant and overlaps, and uses specific algorithms (based on use case) to provide specific recommendations for both users. The incoming datasets may include data from the cloud (e.g.

unlocked via ID) or uploaded via the device(s). The central system sends the feedback (based on use case) to the user's smart devices by only disclosing the feedback, and NOT the data that was collected or used to come up with the, e.g., recommendation. This improves data security and privacy.

In some embodiments, two or more users may be identified through using body coupled communication (BCC). The personal data from each device may be compared or used without disclosing the full dataset or privacy sensitive data to the other users. The service could compare personal data such as multimedia, contacts, location or message and come up with useful suggestions like specific preferences, shared contacts or recommendations without disclosing the actual data. This helps the user to protect their privacy. In some embodiment the body coupled device may be a smart device (e.g. a smartphone or wearable) that has a BCC module and is in close proximity of the user's body; the user is able to communicate with other BCC modules embedded in other personal devices or BCC objects.

In one embodiment, the process is initiated by first activating one of the BCC devices into listening mode. Now the other devices can be discovered through body touch (e.g. shaking hands), over the body coupled communication channel. After this the data set of each device is used at the server-side to perform a comparison (e.g. compare their personal data such as multimedia, contacts, location and messages) or execute another algorithm (e.g. creating recommendations based on the data of the users). Either this data is uploaded for this purpose from each device, or is already stored in the cloud and is made accessible to the server for this purpose. After the execution of the server request, the results are send back to each device.

According to one embodiment, a process flow can be as follows. First, the process is initiated by activating one BCC device in listening mode. Then, other device(s) are discovered via the body communication channel. Then a server request is executed with a dataset of each device. Then, results are sent back to each device.

The invention is described more fully hereinafter with reference to the accompanying drawings. In the description and drawings, like numbers refer to like elements throughout. Relative terms (e.g. horizontal, vertical) as well as derivatives thereof should be construed to refer to the orientation as then described or as shown in the drawing under discussion. It will be understood that when an (electrical) connection between structures or components is described, this connection may be established directly or through intermediate structures or components unless specified otherwise.

Figure 1A:
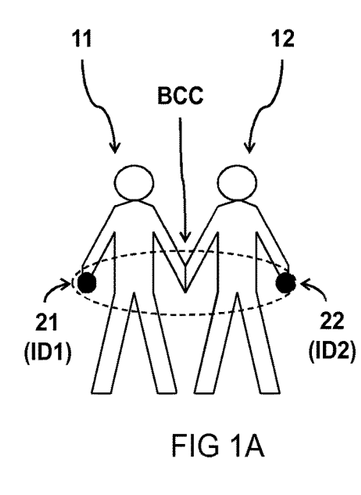
FIGS. 1A-1D illustrate a first embodiment of a method for data sharing between users.

FIGS. 1A-1D illustrate a first embodiment of a method for sharing data SD2 between users 11,12, With reference to FIG. 1A, the embodiment of the method comprises providing a first device 21 and a second device 22. The first device 21 stores first device data ID1 associated with a first user 11. The second device 22 stored second device data ID2 associated with a second user 22. Both devices 21, 22 are capable of body coupled communication BCC. The method further comprises performing body coupled communication BCC between the first and second devices 21,22, e.g. via the bodies of the first and second users 11,12. In one embodiment, the first device data comprises a first identifier ID1 associated with a first user 11. In another or further embodiment, the second device data comprises a second identifier ID2 associated with a second user 12. Alternatively or in addition, the device data ID1 and/or ID2 may also comprise further user data, including data to be shared with the other user.

Figure 1B:
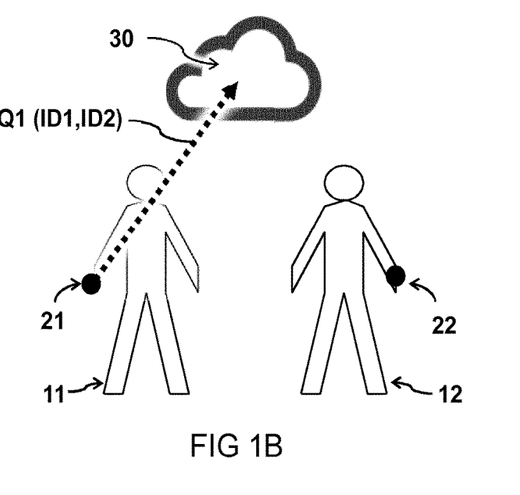

With reference to FIG. 1B, the embodiment of the method comprises in response to the body coupled communication BCC, sending a data request Q1 to a remote server 30. In the embodiment shown, the second device 22 may have sent the second device data ID2 via body coupled communication BCC to the first device 21. Accordingly the first device 21 may send the data request Q1 to the remote server 30 comprising device data ID1,ID2 of both the first and second devices 21,22.

Figure 1C:
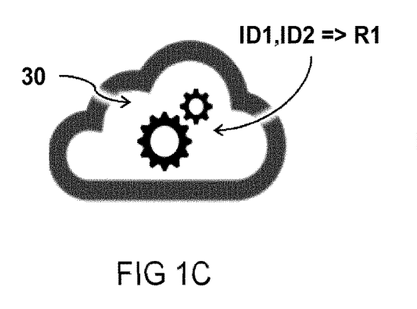

With reference to FIG. 1C, the embodiment of the method comprises processing the data request Q1 at the remote server 30 and determining data to be shared SD2 based. Which data to share may be determined by the remote server 30 based on the first device data ID1 and the second device data ID2.

Figure 1D:
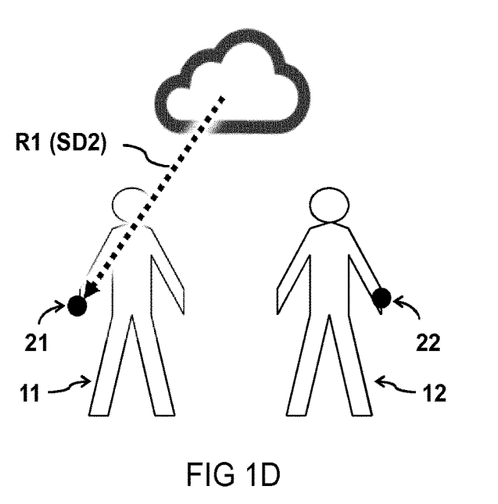

With reference to FIG. 1D, the embodiment of the method comprises sending a data response R1 from the remote server 30 to the first device 21. For example, the data response R1 comprises the shared data SD2.

In one embodiment, the second device 22 sends an encrypted data record via body coupled communication BCC to the first device 21. In another or further embodiment the data response R1 sent from the remote server 30 to the first device 21 comprises a decryption key for decrypting the encrypted data record.

In one embodiment, the second device 22 transfers a data record via body coupled communication BCC to the first device 21 in response to receiving the data response R1 of the remote server 30. In one embodiment, the remote server 30 provides the first device 21 access to a data record AD2 for a specific time period (window) following reception of the data request Q1 or following the BCC communication. In one embodiment, the remote server 30 provides the first device 21 access to a data record AD2 while the device 21 is in proximity to a specific location or device. For example, the data access can be cancelled when the first device 21 leaves the proximity of the second device 22 or a separate location indicator, e.g. WIFI network. The proximity may also be determined in relation to an absolute, e.g. GPS location. Also combinations are possible. In one embodiment, the remote server 30 provides the first device 21 access to a data record AD2 until the second device 22 sends a message to the remote server 30 revoking the access. In one embodiment, the second device 22 sends the second device data ID2 in response to a confirmation entered on the second device 22. In one embodiment, the confirmation comprises entering a security identification of the user 12, e.g. biometric and/or pin code.

Figure 2A:
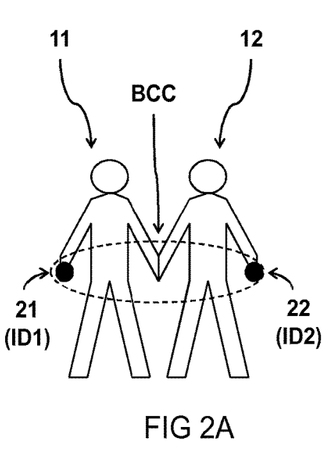
FIGS. 2A-2D illustrate a second embodiment of a method for data sharing between users.
Figure 2B:
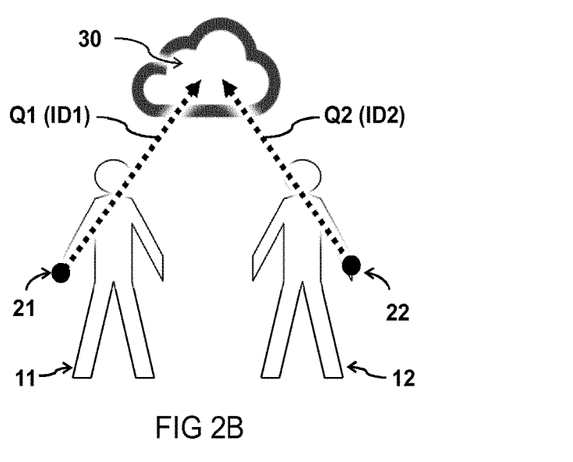

FIGS. 2A-2D illustrate a second embodiment of a method for data sharing between users. The method is similar to the first embodiment, except, as shown in FIG. 2B, each device 21,22 sends a respective data request Q1,Q2 comprising at least the device data ID1,ID2 of the respective device 21,22. Accordingly, it is not necessary to share specific device ID1,ID2 data with the other device before sending the data requests.

Figure 2C:
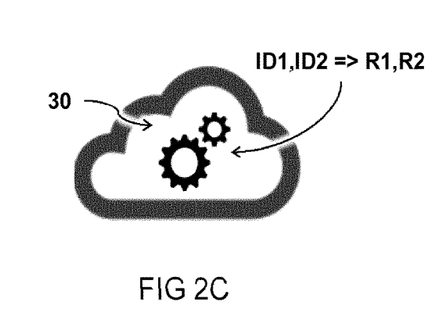
Figure 2D:
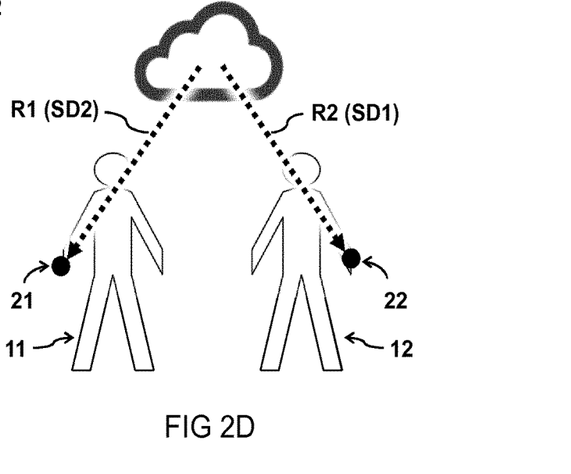

In one embodiment, as shown in FIG. 2D, the method further comprises sending a second data response R2 from the remote server 30 to the second device 22. The second data response R2 comprises shared data SD1 which may be the same as the shared data SD2 sent to the first device 21, i.e. each device receives the same shared data. Alternatively, each device receives a response with different shared data, e.g. based on the data of the other user.

One example scenario may include comparing and matching social network contacts. For example two people meet each other during a business meeting and shake hands for the first time (FIG. 2A). Their personal smart devices, equipped with ADA, make a connection via the user's body. This connection is part of a central system that collects and accesses the users' data that is stored on the personal devices (FIG. 2B). The central system uses an algorithms to determine what contacts the users have in common or are interesting to share. This could be contacts that are stored locally in the address book of the device, but also social platforms such as LinkedIn or Facebook (FIG. 2C). The server sends a message to the users' smart devices with a list of friends/contacts that they have in common without disclosing all other contacts/friends to the other user (FIG. 2D).

Another example scenario may include music recommendations. For example two or more people would like to get a recommendation on a music playlist with music that they all have in common and can enjoy together. By holding hands and touching the audio system at the same time, a connection will be established between all personal devices (e.g. smartphone) and the sound system. This connection makes it possible for the system to determine the user's music preferences based on the music that is stored on these devices, or the music/playlists that are stored on (3rd party) services such as Spotify or Pandora. By using an algorithm the system should be able to determine what music the users have in common, and what genre would be suitable for the current situation. It interprets the data, and returns a list of songs to the audio system without disclosing any specific music titles or artists that are not relevant. The audio system receives the playlist and starts playing the music. The recommendation may also include recommendations of new or other music that is unknown to both people, but fits the combined musical taste, e.g. based on genre, artist, or other metadata of the multimedia collections.

Yet another example scenario may include safe health data sharing. For example, a patient has collected medical data using a health bracelet or other wearable health sensors. This data is stored in the cloud on a server. By touching with his or her hand an ADA device (e.g. tablet) of a medical doctor, a connection will be established between the patients' health device and the doctors' tablet. The identification of the user, coming from the bracelet via ADA, will be send to the ADA device (e.g. tablet) of the doctor. From a central server a subset of the medical health data is send to the ADA device (e.g. tablet) of the medical doctor. At the server the access rights of the medical doctor are checked to see if s/he is allowed to see the data of the patient and which part of the data is made accessible.

These and other scenarios can be extended with personal data encryption keys that are sent by both devices to be used to encrypt data for the purpose of the one-time access rights. One technique for this is using public-key cryptography, wherein one key is secret (or private) and one is public.

Figure 3A:
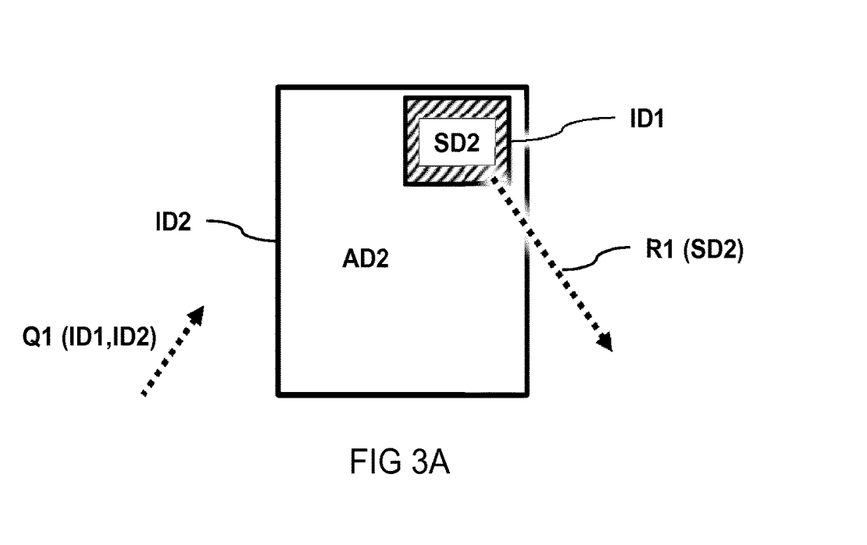
FIG. 3A illustrate a first embodiment for determining data sharing between users.

FIG. 3A illustrate a first embodiment for determining data sharing between users. In the embodiment, the processing of the data request Q1 comprises determining a data record AD2 of the second user associated with a second identifier ID2 and determining access rights of the first user 11 associated with a first identifier ID1. The data record can e.g. located on the remote server 30 processing the request, or another server. A shared part SD2 of the data record AD2 of the second user 12 is based on the access rights of the first user 11. The remote server may compile the data response R1 to the first device 21 based on the shared part SD2 of the data record AD2.

For example, the first user with associated identifier ID1 is a doctor and the second user with associated identifier ID2 is a patient. The data record AD2 may comprises a record of all stored information concerning the patient, e.g. including non-medical data. The doctor may access part SD2 of the patient information based on his access rights, e.g. only relevant medical data for the doctor is shared.

In one embodiment, the second device data ID2 (sent from the second device 22 to the remote server 30) comprises a data record AD2. In another or further embodiment, the remote server 30 determines a part SD2 of the data record AD2 to be shared with the first user 11 based on the first device data ID1, e.g. an identifier associated with the first user. Accordingly it is noted that the device data, sent to the server, may comprise one or both of an identifier associated with a specific user or device and/or a data record of a specific user or device to be partly or fully shared with another user. When the device data only comprises an identifier, a data record may be sent by the server when it is stored or accessible to the server. Alternatively the data record may be sent directly between the devices, e.g. when it is stored on the devices. The server may then mediate which part of the data is to be shared based on the identifiers.

It may be noted that in the embodiment of FIG. 3A, a single request Q1 is sent to the server and a single response given by the server. Alternatively, multiple requests e.g. from different devices may be sent to the server and the server may provide one or multiple responses to such multiple requests. Also other combinations are possible.

Figure 3B:
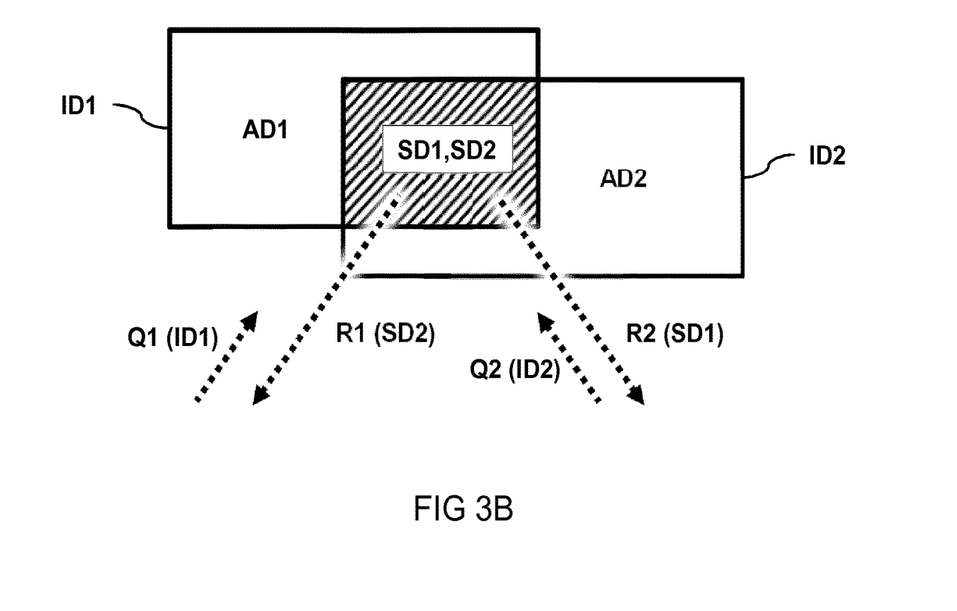
FIG. 3B illustrate a second embodiment for determining data sharing between users.

FIG. 3B illustrate a second embodiment for determining data sharing between users. In the embodiment, the processing of the data request Q1 comprises accessing a first data record AD1 associated with the first device data ID1 and accessing a second data record AD2 associated with the second device data ID2. A shared part SD2 of the second data record AD2 is based on a comparison between the first data record AD1 and the second data record AD2. The remote server may compile the data response R1 to the first device 21 based on the shared part SD2 of the data record AD2. In one embodiment, the comparison is based on metadata associated with the respective data records.

In one embodiment, the first data record AD1 comprises a first collection of multimedia content and the second data record AD2 comprises a second collection of multimedia content. The data response R1 comprises an indication of recommended multimedia content SD1,SD2 based on a comparison between the first and second collections of multimedia content. For example, the recommended multimedia content may be a list of multimedia content owned by both users according to their respective data records. The recommendation may also be more general, e.g. a common genre found in both multimedia collections. In one embodiment, two devices capable of multimedia playback are coupled via BCC and a playlist is recommended by a server upon request by one or both devices.

It may be noted that in the embodiment of FIG. 3B, multiple request Q1,Q2 are sent to the server and multiple responses given by the server. Alternatively, a single request e.g. from one of the devices may be sent to the server and the server may provide one or multiple responses to such single request. Also other combinations are possible.

Figure 4:
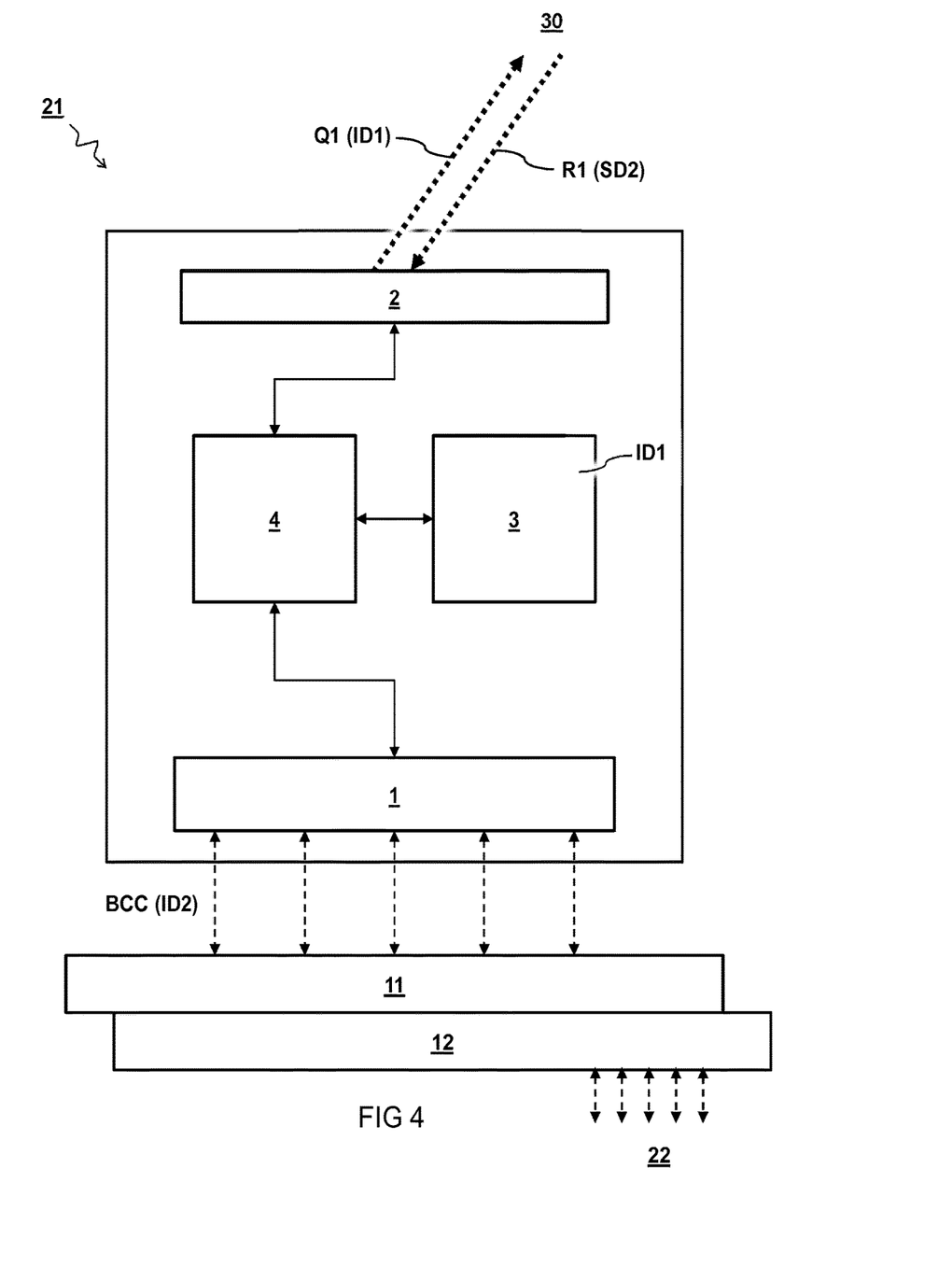
FIG. 4 illustrate an embodiment of a body-coupled communication device.

FIG. 4 illustrate an embodiment of a body-coupled communication device 21, e.g. for use in the methods described herein. The device 21 comprises a coupler arrangement 1, a transceiver 2, and a controller 4.

In one embodiment, the coupler arrangement 1 is configured to couple signals between the device 21 and a human body 11 for performing body coupled communication BCC via the body 11 e.g. with a second body-coupled communication device 22. The coupler arrangement may comprise signal electronics configured to generate and/or process signals sent or received by the coupler arrangement.

In one embodiment, the transceiver 2 is configured to transmit data ID1 to a remote server 30 or other device 22 and optionally receive data SD2 from the remote server 30 or the second device. The data may e.g. be sent between the devices via a local peer to peer network e.g. via Bluetooth. In one embodiment, the transceiver 2 is independent of the coupler arrangement 1, e.g. providing wired or wireless non-body coupled communication. In one embodiment, the transceiver 5 comprises an antenna to transmit and receive wireless signals, e.g. radio waves. In another embodiment, the transceiver 5 comprises a wired communication device. The transceiver may comprise a separate transmitter and receiver or be integrated in a single device. The transceiver may comprise signal electronics configured to generate and/or process signals sent or received by the transceiver In one embodiment, the controller 4 is configured to listen for body coupled communication BCC from the second device 22 via the coupler arrangement 1. In response to the body coupled communication BCC, the controller may transmit a data request Q1 to the remote server 30 via the transceiver 2. The transmission may be initiated e.g. as soon as body coupled communication is initiated and/or after a body-coupled communication channel between the devices 21,22 is negotiated. In one embodiment, the controller listens for a data response R1 from the remote server 30 via the transceiver 2, e.g. after transmitting the data request Q1.

In one embodiment, the device comprises a memory 3 storing first device data ID1. In another or further embodiment, the controller is configured to receive second device data ID2 from the second device 22 via the coupler arrangement 1, and transmit a data request Q1 comprising the first device data ID1 and the second device data ID2 to the remote server 30 via the transceiver 2. Alternatively, the device sends a data request with only the first device data ID1. For example a second device 22 may send its respective device data ID2.

In one embodiment, the body-coupled communication is established by body contact between the first and second users 11,12. Alternatively, or in addition, the communication may be established via intermediate conducting structures. Alternatively, or in addition, the communication may be established when two users simultaneously or sequentially contact one or more device capable of body coupled communication.

Figure 5:
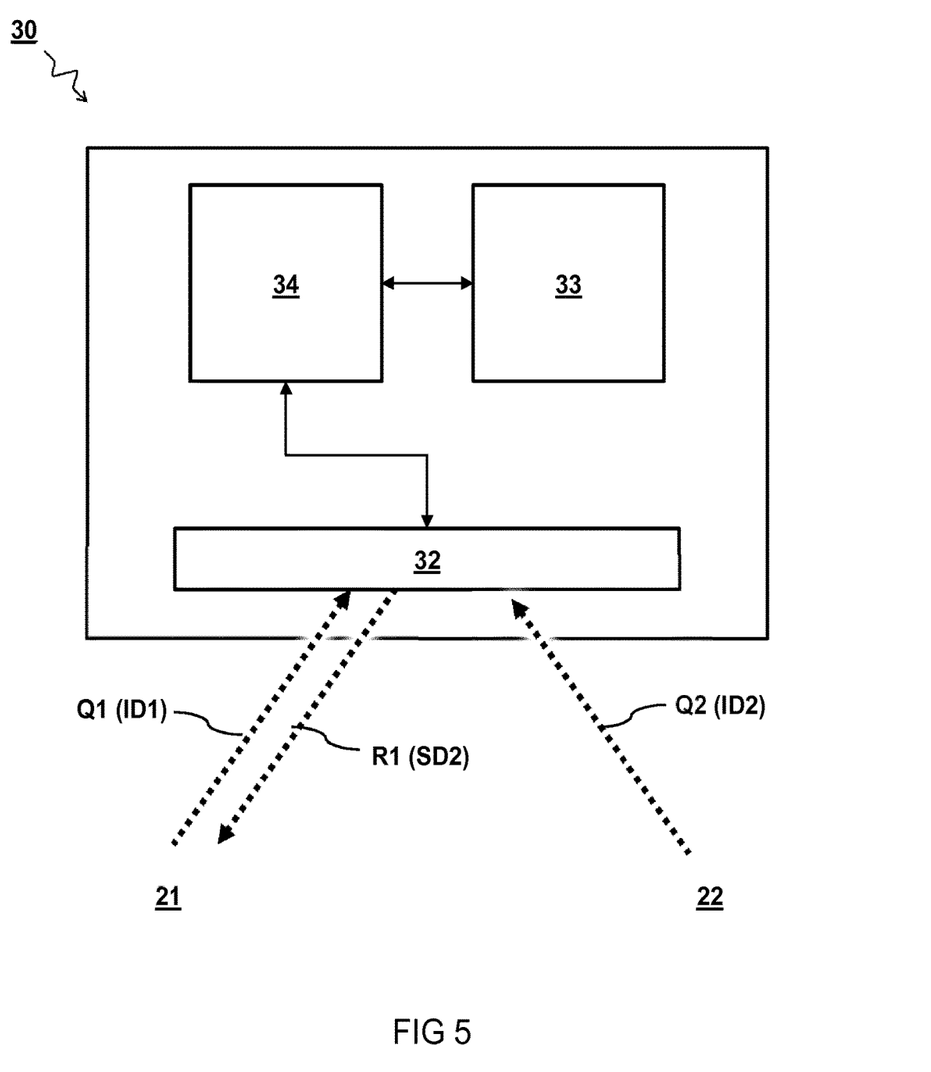
FIG. 5 illustrates an embodiment of a remote server.

FIG. 5 illustrates an embodiment of a remote server 30, e.g. for use in the methods described herein.

In one embodiment, the computer server 30 comprises a transceiver 32, a controller 34, and a memory 33. In one embodiment, the memory 33 stores program instructions that can be executed by the controller 34 to provide one or more embodiments as described herein.

In one embodiment, the controller 34 controls the transceiver 32 to listen for one or more data request Q1,Q2 from a first and/or second device 21,22. The one or more data requests Q1,Q2 comprise a first identifier ID1 associated with a first user 11 and a second identifier ID2 associated with a second user 11.

In one embodiment, the controller 34 process the data requests Q1,Q2 to determine the first and second identifiers ID1,ID2, e.g. in response to receiving the one or more data requests Q1,Q2.

In one embodiment, the controller 34 determines a data record AD2 of the second user 12 associated with the second identifier ID2. In one embodiment, the controller 34 determines access rights of the first user 11 associated with the first identifier ID1. In one embodiment, the controller 34 determines a shared part SD2 of the data record AD2 of the second user 12 based on the access rights of the first user 11.

In one embodiment, the controller 34 compiles a data response R1 based on the shared part SD2 of the data record AD2. In one embodiment, the controller 34 controls the transceiver to send a data response R1 from the remote server 30 to the first device 21.

For the purpose of clarity and a concise description, features have been described herein as part of the same or separate embodiments, however, it will be appreciated that the scope of the invention may include embodiments having combinations of all or some of the features described. For example, while embodiments were shown for methods and devices for body coupled communication also alternative ways may be envisaged by those skilled in the art having the benefit of the present disclosure for achieving a similar function and result. For example electrical components and structures may be combined or split up into one or more alternative components. While the embodiments show two body coupled devices and one server, also further BCC devices and/or servers may be added. For example, data may be shared between more than two devices or users. For example data may be stored on different servers. Servers storing data may be separate from servers determining data sharing. The various elements of the embodiments as discussed and shown offer certain advantages, such as providing intuitive yet controllable data sharing. Of course, it is to be appreciated that any one of the above embodiments or processes may be combined with one or more other embodiments or processes to provide even further improvements in finding and matching designs and advantages. It is appreciated that this disclosure offers particular advantages to data sharing by body coupled communication, and in general can be applied for any application wherein body coupled communication is used to initiate data access via a remote server.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage. In particular, all working combinations of the claims are considered inherently disclosed.

The invention claimed is:

1. A method for sharing data, the method comprising:
   providing a first body coupled communication device, wherein the first body coupled communication device is arranged to store a first device data;
   providing a second body coupled communication device, wherein the second body coupled communication device is arranged to store a second device data;
   initiating a body coupled communication between the first body coupled communication device and the second body coupled communication device;
   in response to the body coupled communication, sending a data request from one or both of the body coupled communication devices to a remote server, wherein the data request comprises the first device data and the second device data;

processing the data request and determining a to-be-shared data based at least in part on both the first device data and the second device data;

sending a data response from the remote server to the first device, wherein the data response comprises the to-be-shared data; and sending a second data response from the remote server to the second body coupled communication device, wherein the second data response comprises the to-be-shared data.

2. The method according to claim 1, wherein the first device data comprises a first identifier and the second device data comprises a second identifier; and wherein the processing of the data request by the remote server comprises:

determining a data record associated with the second identifier;

determining access rights associated with the first identifier; and determining a to-be-shared part of the data record based on the access rights;

compiling the data response to the first body coupled communication device based on the to-be-shared part of the data record.

3. The method according to claim 1, wherein the second body coupled communication device sends the second device data via the body coupled communication to the first body coupled communication device, wherein the first body coupled communication device sends the data request to the remote server comprising device data of both the first body coupled communication device and the second body coupled communication device.

4. The method according to claim 1, wherein each body coupled communication device sends a respective data request comprising at least the device data of the respective body coupled communication device.

5. The method according to claim 1, wherein the processing of the data request by the remote server comprises:

accessing a first data record associated with the first device data;

accessing a second data record associated with the second device data;

determining a to-be-shared part of the second data record based on a comparison between the first data record and the second data record;

compiling the data response to the first body coupled communication device based on the to-be-shared part of the second data record.

6. The method according to claim 1, wherein the second device data sent from the second body coupled communication device to the remote server comprises a data record, and wherein the remote server determines a part of the data record to be shared based on the first device data.

7. The method according to claim 1, wherein the second body coupled communication device transfers a data record via the body coupled communication to the first body coupled communication device in response to receiving the data response of the remote server.

8. The method according to claim 1, wherein the remote server provides the first body coupled communication device access to a data record for a specific window following reception of the data request while the first body coupled communication device is in proximity to a location device.

9. The method according to claim 1, wherein the remote server provides the first body coupled communication device access to a data record until the second body coupled communication device sends a message to the remote server revoking the access.

10. The method according to claim 1, wherein the second body coupled communication device sends the second device data in response to a confirmation entered on the second body coupled communication device.

11. A non-transitory computer-readable medium having one or more executable instructions stored thereon, wherein the executable instructions when executed by a processor, cause the processor to perform a method for sharing data, the method comprising:

providing a first body coupled communication device for storing a first device data;

providing a second body coupled communication device for storing a second device data;

initiating a body coupled communication between the first body coupled communication device and the second body coupled communication device;

in response to the body coupled communication, sending a data request from one or both of the body coupled communication devices to a remote server, wherein the data request comprises the first device data and the second device data;

processing the data request and determining a to-be-shared data based at least in part on both the first device data and the second device data;

sending a data response from the remote server to the first body coupled communication device, wherein the data response comprises the to-be-shared data; and sending a second data response from the remote server to the second body coupled communication device, wherein the second data response comprises the to-be-shared data.

12. A method for sharing data, the method comprising:

providing a first body coupled communication device, wherein the first body coupled communication device is arranged to store a first device data;

providing a second body coupled communication device, wherein the second body coupled communication device is arranged to store a second device data;

initiating a body coupled communication between the first body coupled communication device and the second body coupled communication device;

in response to the body coupled communication, sending a data request from one or both of the body coupled communication devices to a remote server, wherein the data request comprises the first device data and the second device data;

processing the data request and determining a to-be-shared data based at least in part on both the first device data and the second device data; and sending a data response from the remote server to the first device, wherein the data response comprises the to-be-shared data, wherein the second body coupled communication device sends an encrypted data record via the body coupled communication to the first body coupled communication device, and wherein the data response sent from the remote server to the first body coupled communication device comprises a decryption key, wherein the decryption key is arranged to decrypt the encrypted data record.

13. The method according to claim 12, wherein the first device data comprises a first identifier and the second device data comprises a second identifier; and wherein the processing of the data request by the remote server comprises:
   determining a data record associated with the second identifier;
   determining access rights associated with the first identifier; and
   determining a to-be-shared part of the data record based on the access rights;
   compiling the data response to the first body coupled communication device based on the to-be-shared part of the data record.

14. The method according to claim 12,
wherein the second body coupled communication device sends the second device data via the body coupled communication to the first body coupled communication device,
wherein the first body coupled communication device sends the data request to the remote server comprising device data of both the first body coupled communication device and the second body coupled communication device.

15. The method according to claim 12, wherein each body coupled communication device sends a respective data request comprising at least the device data of the respective body coupled communication device.

16. The method according to claim 12, wherein the processing of the data request by the remote server comprises:
   accessing a first data record associated with the first device data;
   accessing a second data record associated with the second device data;
   determining a to-be-shared part of the second data record based on a comparison between the first data record and the second data record;
   compiling the data response to the first body coupled communication device based on the to-be-shared part of the second data record.

17. The method according to claim 12,
wherein the second device data sent from the second body coupled communication device to the remote server comprises a data record, and
wherein the remote server determines a part of the data record to be shared based on the first device data.

* * * * *